(12) United States Patent
Van Steenwyk et al.

(10) Patent No.: US 7,576,532 B2
(45) Date of Patent: Aug. 18, 2009

(54) MOTION TRANSDUCER FOR MOTION RELATED TO THE DIRECTION OF THE AXIS OF AN EDDY-CURRENT DISPLACEMENT SENSOR

(75) Inventors: Donald H. Van Steenwyk, Paso Robles, CA (US); Timothy M. Price, Templeton, CA (US); George K. Walker, Pismo Beach, CA (US); Cory B. Wilson, Visalia, CA (US)

(73) Assignee: Scientific Drilling International, Houston, TX (US)

( * ) Notice: Subject to any disclaimer, the term of this patent is extended or adjusted under 35 U.S.C. 154(b) by 0 days.

(21) Appl. No.: 11/708,076

(22) Filed: Feb. 20, 2007

(65) Prior Publication Data
US 2007/0229064 A1    Oct. 4, 2007

Related U.S. Application Data

(60) Provisional application No. 60/788,619, filed on Apr. 3, 2006.

(51) Int. Cl.
*G01B 7/14* (2006.01)
*G01P 3/49* (2006.01)

(52) U.S. Cl. .................................. 324/207.24; 324/176
(58) Field of Classification Search ............ 324/207.11, 324/207.15, 207.16, 207.22, 207.23, 207.24, 324/207.25, 207.26, 160, 163, 164, 165, 324/166, 176, 177; 73/514.39
See application file for complete search history.

(56) References Cited

U.S. PATENT DOCUMENTS

| | | | | | |
|---|---|---|---|---|---|
| 3,969,677 | A | * | 7/1976 | Woyton | 327/29 |
| 5,045,785 | A | * | 9/1991 | Hansen | 324/207.16 |
| 5,083,084 | A | * | 1/1992 | Bauer et al. | 324/207.19 |
| 5,525,900 | A | * | 6/1996 | Larsen et al. | 324/207.12 |
| 5,742,161 | A | * | 4/1998 | Karte | 324/207.16 |
| 2003/0102862 | A1 | * | 6/2003 | Goto et al. | 324/207.16 |
| 2006/0290346 | A1 | * | 12/2006 | Habenschaden et al. | 324/207.16 |

FOREIGN PATENT DOCUMENTS

JP    360100766    *    6/1985    ............. 324/160

* cited by examiner

*Primary Examiner*—Kenneth J Whittington
(74) *Attorney, Agent, or Firm*—William W. Haefliger

(57) ABSTRACT

A motion transducer comprising one or more electromagnetic coils provided on a first element, each of the coils having a magnetic axis of symmetry.

4 Claims, 6 Drawing Sheets

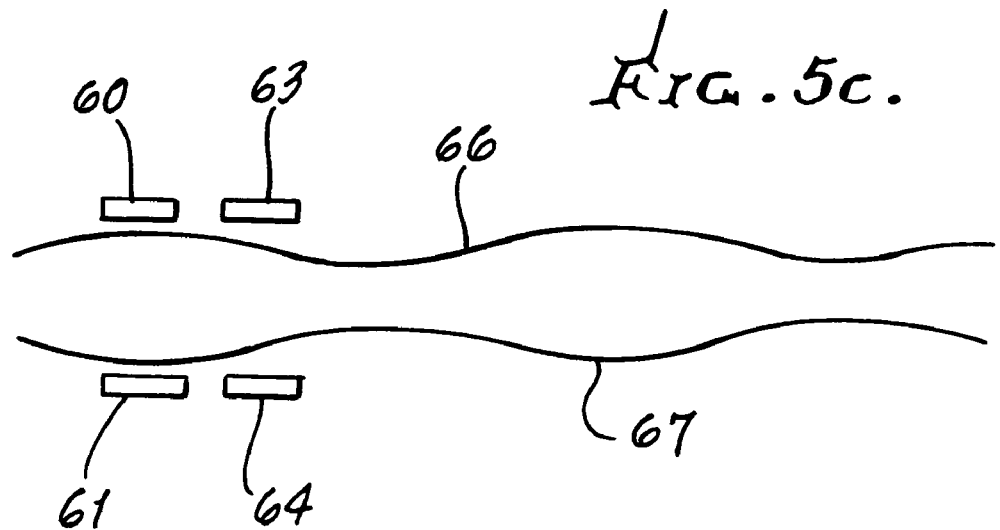
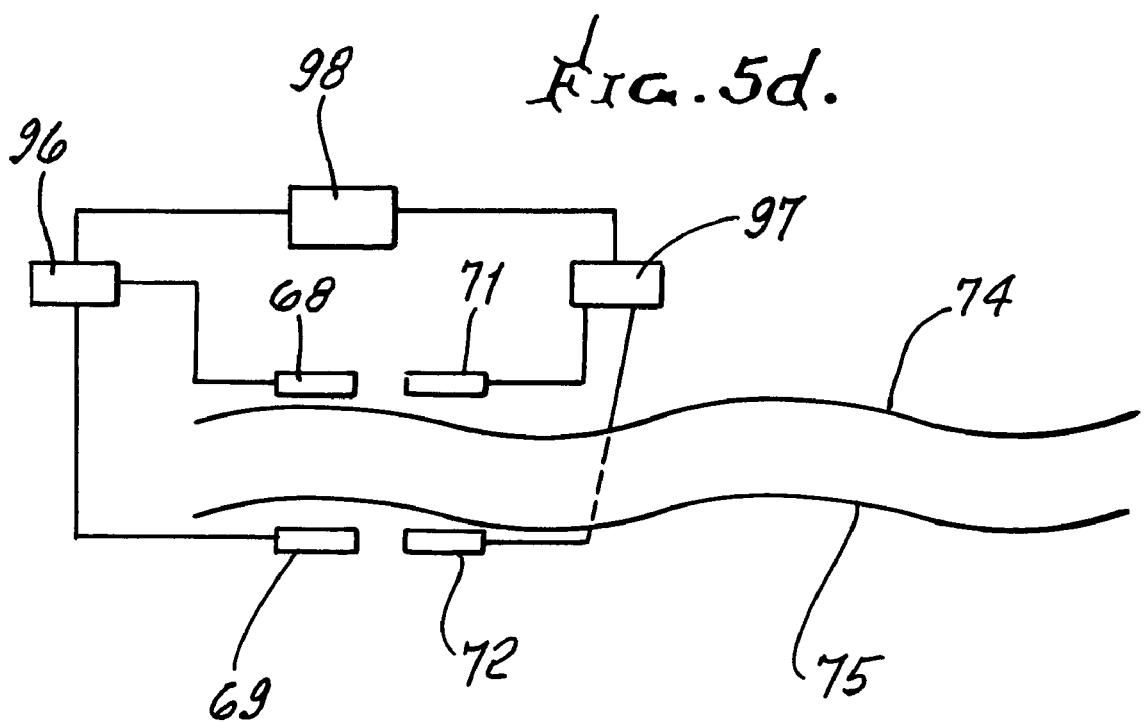

US 7,576,532 B2

MOTION TRANSDUCER FOR MOTION RELATED TO THE DIRECTION OF THE AXIS OF AN EDDY-CURRENT DISPLACEMENT SENSOR

This application claims priority from provisional application Ser. No. 60/788,619, filed Apr. 3, 2006.

BACKGROUND OF THE INVENTION

This invention relates generally to motion transducers, and more particularly to transducers for motion having an angular relation to the direction of the axis of an Eddy current displacement sensor.

There are many known requirements for sensing motion having considerable travel distances. Many distances of interest fall in the range of from a few tenths of an inch to several inches or even tens or hundreds of inches. Various technologies have been applied to this problem measurement area. Optical grids on either a fixed or moving element have been used with small sections of a similar optical grid with a light sensor on the opposing element. One linear motion sensor is a linear variable differential transformer (LVDT) type of a device. In such an LVDT, a primary winding and two secondary windings are provided on one element. An armature or iron core is provided on a second element, inside the structure holding the windings. The magnetic coupling between the primary and secondary coils depends on the linear position of this armature in relation to the two secondary windings. Such LVDT devices have relatively low cost, solid robust characteristics for a wide variety of environments, and very good resolution.

Various eddy-current displacement sensors have been used for detecting small motions between a fixed coil and a conducting surface. As the distance between the fixed coil and the conductive surface changes, eddy currents are induced in the material of the conducting surface. The effect of these eddy currents is reflected into the fixed coil, and this in effect changes the apparent resistance and inductance of the fixed coil. Such eddy current displacement sensors are generally used only for detecting small changes in the distance between the fixed coil and the conducting surface. Such devices are typically useful only for measurements of distance of a few millimeters for the gap between the fixed coil and the conducting surface. If such an eddy-current displacement sensor is used to measure the distance between a fixed coil and a conductive surface, and the conducting surface is inclined with respect to the magnetic axis of the fixed coil, the change in gap as the conductive surface is moved in relation to the magnetic axis, the eddy-current effect in the fixed coil may then be interpreted as a measure of that movement normal to the magnetic axis.

SUMMARY OF THE INVENTION

It is a major objective of this invention to provide an improved motion transducer for the measurement of displacement of an electrically conducting object, using an eddy-current displacement sensor to detect motion having an angular relation to the magnetic axis of the fixed coil.

The invention provides a motion transducer that comprises an electromagnetic coil, a means to excite this coil with electromagnetic energy, a conducting surface nominally orthogonal to the magnetic axis of the coil but inclined at some angle relative to the axis, a means to detect in the electromagnetic coil the eddy-current effects of the currents induced in the conducting surface in response to movement, and means to interpret changes in such observed eddy-current effects as an indication of the motion of the conduction surface in a direction relative to the magnetic axis of the electromagnetic coil. Specific embodiments of the invention contemplate variations in direction of motion, the form of such motion, the shape of the conducting surface, and variations in the electronic means to detect the desired motion. Further, means to improve the accuracy of the motion transducer, by calibration and or measurement computations, are included within the scope of the invention. Another object is to provide a method of operating a motion transducer having coil means having impedance, and conducting surface means, that includes a) electrically energizing said coil means in alternating sense, b) relatively displacing said coil means and said conducting surface means to produce changes in the coil means impedance, c) and detecting said changes in impedance as a function of said relative displacement.

An important feature of the invention is that the degree of magnetic coupling into the conducting surface varies more slowly with the magnitude of the motion of the conductive surface, being less than that which would be seen in direct motion along or parallel to the magnetic axis of the electromagnetic coil. This permits an extended range to any motion to be measured.

These and other objects and advantages of the invention, as well as the details of an illustrative embodiment, will be more fully understood from the following specification and drawings, in which:

DRAWING DESCRIPTION

FIGS. 5a, 5b, 5c and 5d show alternative forms for a conducting surface for an extended range linear motion transducer of the present invention type;

DETAILED DESCRIPTION

Figure 1:
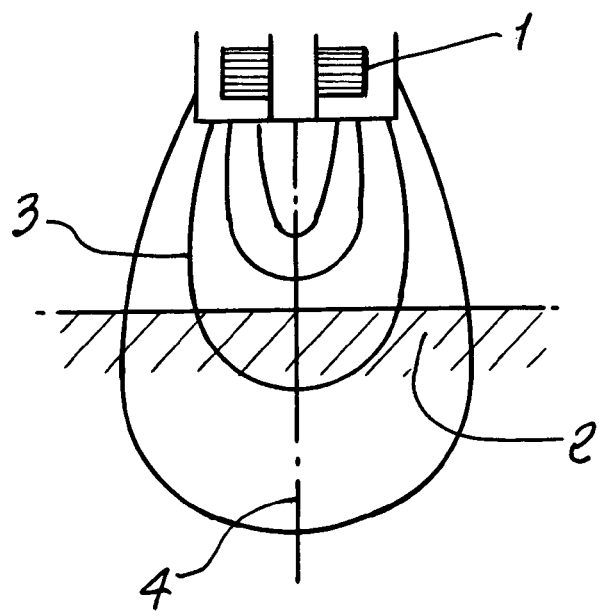
FIG. 1 shows the basic magnetic elements of an eddy-current displacement detector.

FIG. 1 shows in cross section the basic magnetic elements of an eddy-current displacement sensor. An electromagnetic coil 1 is shown disposed above a conducting surface 2. Electromagnetic flux lines 3 extend from the coil into the conducting surface material. The magnetic axis of symmetry 4 for the electromagnetic flux is shown as normal to the plane of the conducting surface. When the coil 1 is excited with an alternating current, the alternating magnetic flux 3 induces electrical currents into the conducting surface material. The effect of such currents is to change the apparent impedance of the coil in a manner that decreases the self inductance of the coil and increases the apparent resistance of the coil. As the coil is moved closer to the conducting surface, these effects are increased and as the coil is moved away from the conducting surface the effects are decreased. Thus, any observed apparent changes in the impedance of the coil may be interpreted as a change in the distance between the coil and the conducting surface. Note that displacements of a uniform planar conducting surface in a direction normal to the direction of the axis 4 of magnetic symmetry do not change the degree of coupling of the magnetic flux lines 3 to the conducting surface material and therefore do not cause any apparent change in the impedance of the coil.

Figure 2A:
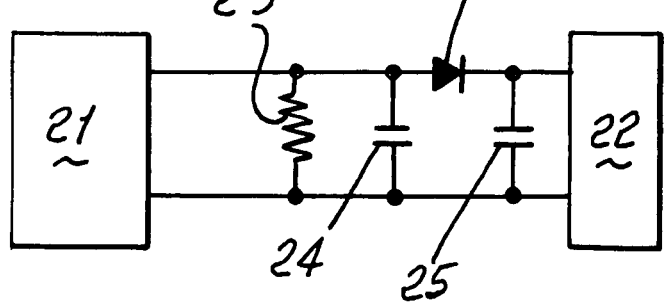
FIG. 2a and FIG. 2b show two different simple embodiments of electronic circuits that can provide a measure of distance between an electromagnetic coil and a conducting surface.
Figure 2B:
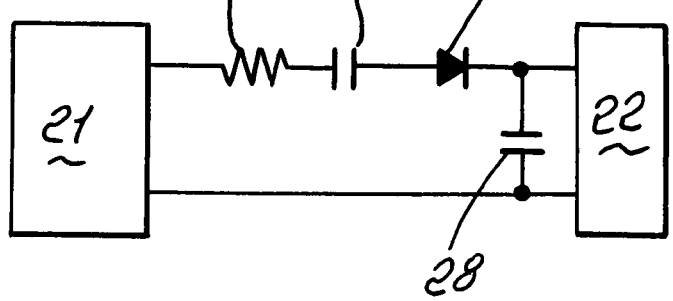

FIGS. 2a and 2b show two simple electrical circuits that can be used to observe the changes in coil impedance resulting in changes in the distance from the coil to the conducting surface. In FIG. 2a, a parallel connection is made between the electromagnetic coil 23 and tuning capacitor 24. This parallel connection is excited by an alternating current source 21. The alternating voltage developed across the parallel connection is rectified by diode 26 and the resulting rectified voltage is filtered by capacitor 25. The resulting direct current voltage is measured by, for example, a digital voltmeter 22. As the coil is moved toward or away from the conducting plate, the measured voltage at voltmeter 22 provides an indication of such motion. In FIG. 2b, a series connection is made of the coil 23 and a series tuning capacitor 27. Again a diode 26 rectifies the series current and the output is filtered by capacitor 28. As in the prior figure, the digital voltmeter 22 provides a measurement of the resulting voltage and therefore of the distance between the coil and the conducting surface. There are many other possible electronic circuits for making similar measurements of the effects on the impedance of the coil resulting from eddy currents in the conducting surface. Circuits using phase-sensitive demodulators may be used to separate the effects of resistance and inductance variations resulting from eddy currents in the conductive surface.

As stated previously in the discussion of FIG. 1, displacements of a uniform planar conducting surface in a direction normal to the direction of the axis 4 of magnetic symmetry do not change the degree of coupling of the magnetic flux lines 3 to the conducting surface material and therefore do not cause any apparent change in the impedance of the coil. However, if the conducting surface 2 is not normal to the coil magnetic axis of symmetry, motion of the surface in a direction normal to such axis will correspondingly change the distance between the coil and the surface.

Figure 3A:
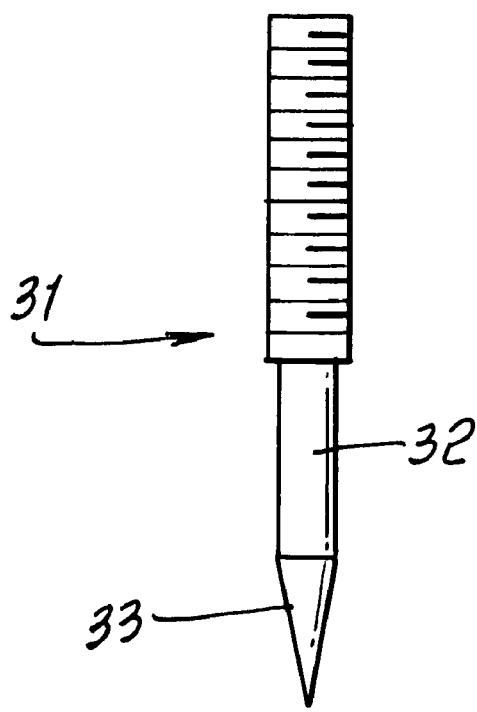
FIG. 3a shows a simple structure that has been used to form a linear motion transducer, for motion of a conducting surface normal to the magnetic axis of the electromagnetic coil.

FIG. 3a shows part of an apparatus related to the present invention. A member 31 made of a magnetic plain steel has a 4-40 screw thread at one end and a cylindrical section 32 in its center. A pointed end 33 has an included angle on the point of seven degrees.

Figure 3B:
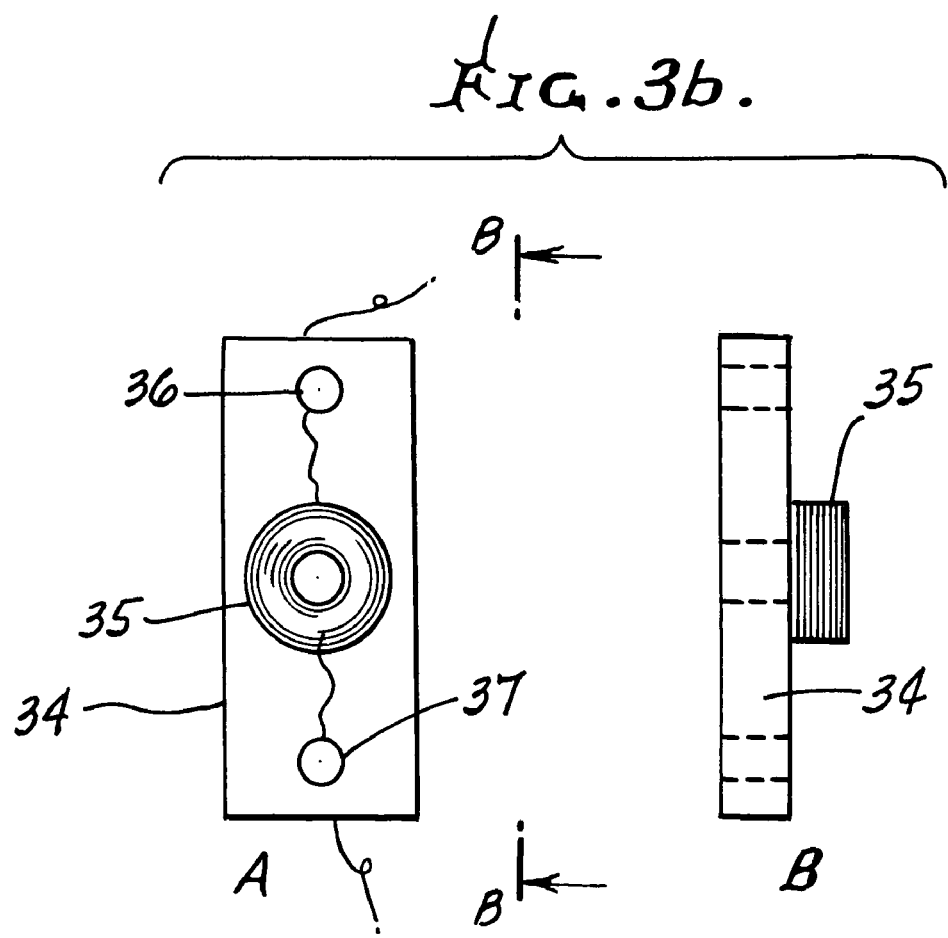
FIG. 3b shows details of an electromagnetic coil used with the apparatus of FIG. 3a; and includes view A taken in section and view B taken on lines B-B of view A.
Figure 4:
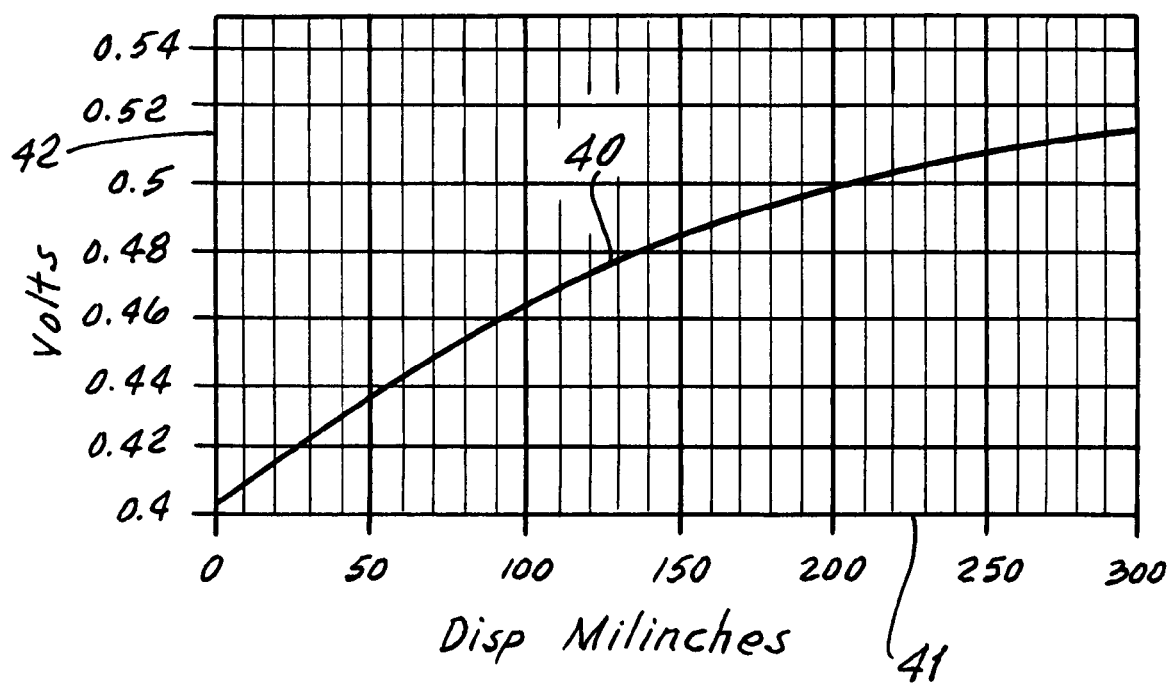
FIG. 4 is a graph that shows a sample of data measured with the apparatus of FIGS. 3a and 3b when connected to an electronic circuit of the type shown in FIG. 2.

FIG. 3b in views A and B shows an electromagnetic coil 35 having one hundred and fifty turns of fifty gauge wire mounted on a block 34. Coil terminals 36 and 37 are provided for connection to test electronics. The coil 35 is mounted adjacent to pointed end 33 of member 31, with the long axis of the block 34 parallel to the long axis of member 31. Thus as the pointed end 33 moves axially along the long axis of member 31 the distance between the surface of the pointed end 31 and the coil 35 changes. Since the steel member 31 is a conducting material, the eddy currents induced by the coil change and the apparent impedance of the coil changes. FIG. 4 shows a curve 40 of the measured voltage 42 vs. the displacement 41 of the member 31 along its long axis. For this measurement, the member 31 was held in a fixture having a 4-40 screw thread so that the member 31 could be moved axially in a controlled manner. The coil 35 on its block 34 was also mounted to the fixture so that its position did not move during the test. Although steel was used for the conducting surface, various conducting material, both magnetic and non-magnetic, may be used to obtain particularly desired characteristics.

The linearity of the curve 40 results in FIG. 4 is not precise but various means are available to improve on the measurement accuracy. The simplest and most direct way is to calibrate the voltage output vs. linear motion and then correct the measured data using a computed model of the data. Alternatively, the spacing of the coil from the moving member 31, the angle of the conducting surface with respect to the axis of symmetry of the coil, and more complex electronic circuits can be used to improve the linearity and accuracy of the measured motion. Note that the shape of the conducting surface can be altered so as to compensate for non-linearity, or to achieve a variety of functional relationships between the sensed motion and the electronic signal output. More complex circuits using demodulators instead of simple rectifiers are usable to select solely the resistive component of the coil impedance change or solely the inductive component of the impedance change. Beyond the issues of basic linearity and accuracy, environmental effects such as temperature may contribute errors since, for example, temperature increases would tend to increase the resistance of the coil without any corresponding change in the distance between the coil and the conducting surface. One simple compensation means comprise an identical coil not subjected to a variable distance from the conducting surface and used to subtract the output measurement for such a coil from the output of a similar coil subjected to a variable distance from the conducting surface. Also, various means are available to extend the measurement range of the mechanism.

Figure 5A:
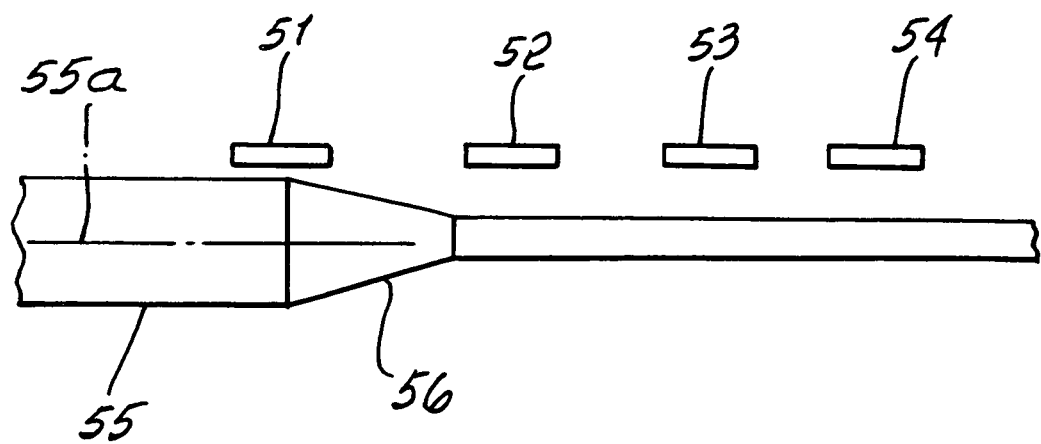
Figure 5B:
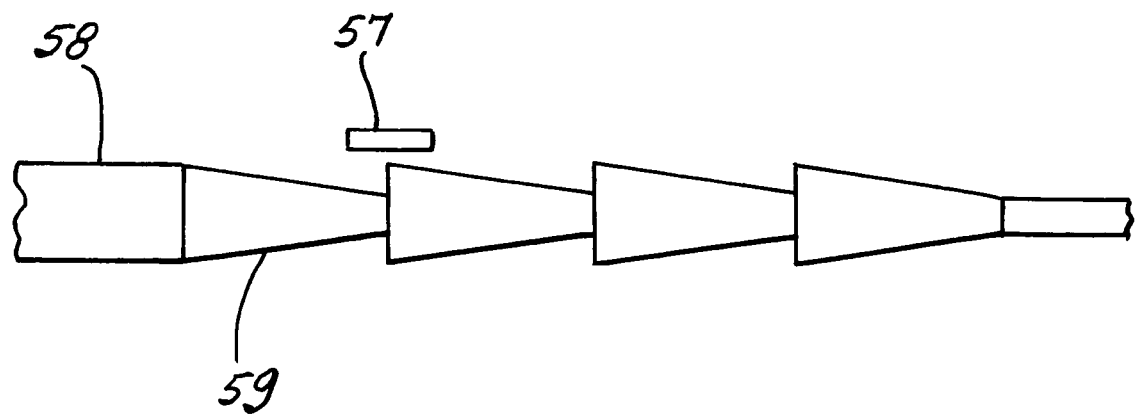

FIG. 5a shows one way to extend the range of measurement. A moving conducting element 55 (moveable in the direction of axis 55a) has one angled section 56 and a number of non-moving axially spaced coils 51, 52, 53 and 54. With such an arrangement a curve such as shown in FIG. 4 is obtained as the surface of angled section 56 passes by each of the individual coils. Alternatively, as shown in FIG. 5b a moving conducting element having a number of angled sections 59 with surfaces passed axially by a single coil 57, again provide a sequence of curves as each section 59 passes by the coil 57. Note that another set of coils can be used on the opposite side of either the element 55 or the element 58. In this configuration, the output of the two opposite-sided coils would be added together. The resulting sum would then be insensitive to any lateral motion of either element. Such means improves accuracy by averaging out some imperfections in the element surfaces.

FIG. 5c shows another alternative configuration for an extended range sensor. A conducting member has upper surface 66 and lower surface 67. These surfaces have, for example a sinusoidal shape extending 180° out of relative phase. A first pair of coils 60, 61 and a second pair of coils 63, 64 are shown at opposite sides of 67. Coils 60 and 63 are in a row, as are 61 and 64. The axial spacing between the coil pairs is equivalent to one-quarter wavelength of the sinusoidal shape. The output measurements from the individual coils of the first pair are added together. As stated in the discussion of FIGS. 5a and 5b, such an addition removes the effect of any lateral motion of the moving conducting member since when one gap is increased the other is decreased. A similar addition of the outputs of the second pair results in another measurement. Since the coils of the pairs are spaced a quarter wave length apart, one measurement may be taken as the sine of the axial measurement and the other may be taken as the cosine of the axial measurement. The actual axial measurement may then be computed as the arctangent of the ratio of the output of the first pair to the output of the second pair. Note that since the measurement is derived from the ratio of the two individual pair measurements, any common-mode variation in the amplitude of the individual measurement does not introduce error in the derived measurement. It will be noted by those skilled in the art that this latter benefit obtained from using the ratio of two measurements is also obtainable if the lower coils and the lower sinusoidal surface are not included in a device where the elements 60, 63, and 66 are used. The only difference would be that the benefit of addition that removes the effect of any lateral motion of the moving conducting member would not be obtained.

FIG. 5d shows another alternative using sinusoidal surface shapes. The conducting surfaces 74 and 75 are again sinusoidal in shape but extending in relative phase. In this alternative, the outputs of coil 69 would be subtracted from the output of coil 68 and the output of coil 72 would be subtracted from the output of coil 71 to form measurement quantities representing the sine and the cosine of the displacement distance. Each of these differences would be free of effects from temperature of the individual coils and again, as discussed for FIG. 5c above, the distance equivalent angle would be computed from the ratio of the outputs of the individual pairs providing a second degree of insensitivity. See subtracting circuitry 96 and 97 and circuitry 98 to form such measurement quantities. Circuit 98 also represents computing of the distance equivalent angle.

Any of the configurations of FIGS. 5a, 5b, 5c and 5d can be combined in as two or more sets of components with different axial pitches to the coil spacing or conducting surface variations to provide a coarse-fine type of measurement.

Figure 6:
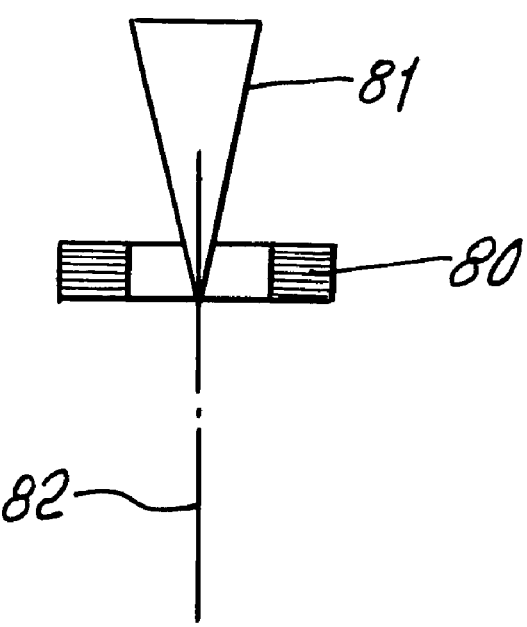
FIG. 6 shows another alternative configuration having a conical conducting surface surrounded by an electromagnetic coil.

FIG. 6 shows another alternative configuration having a conical conducting surface surrounded by an electromagnetic coil. An electromagnetic coil 80 having a magnetic axis 82 has a moveable generally-conical conducting surface 81 positioned for motion directly along the magnetic axis 82. As the moveable conical conducting surface moves along this line, the coupling of the magnetic field into the surface changes, increasing as the surface penetrates further into the central region of the electromagnetic coil. As in the previous discussion, this increased coupling will result in increased eddy currents in the conducting surface and corresponding changes in the effective resistance and inductance of the coil. The generally-conical conducting surface 81 may be configured to have a functional shape that varies with distance along its axis 82 to achieve an other-than-linear output function of distance moved along axis 82. The surface 81 may for example be provided as a number of cylindrical steps or a number of cones with different slopes.

Figure 7:
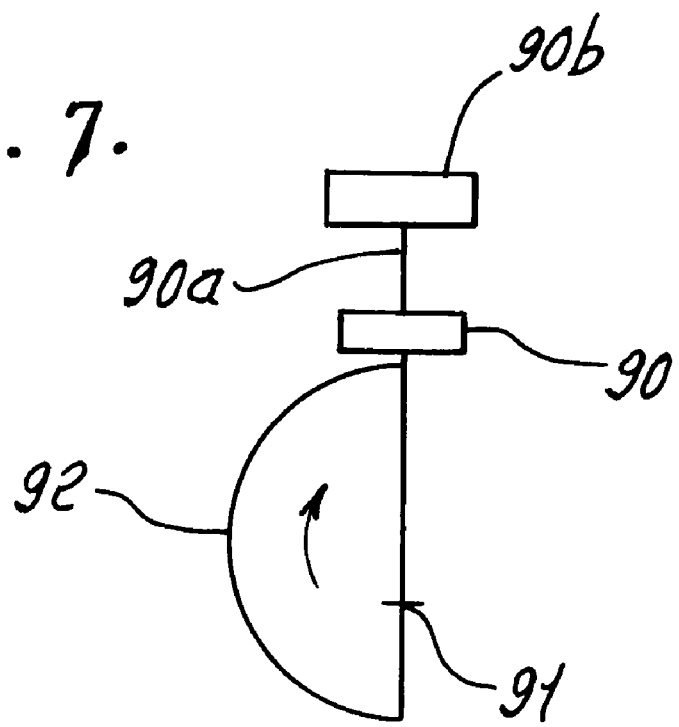
FIG. 7 shows an example of a motion transducer for angular motion based on the current invention.

FIG. 7 shows an example of a motion transducer for angular motion, based on the current invention. An electromagnetic coil 90 is positioned adjacent to a spiral-shaped conducting surface 92 having a center of rotation 91. Rotation of the surface 92 about the center 91 results in a change in the distance between the coil and the conducting surface and hence, as in the previously discussed alternatives the magnetic coupling changes and the resulting eddy currents change causing effective changes in the resistance and the inductance of the coil. If the radius of the conducting surface 92 from its center of rotation 91 is directly proportional to the angular position the output at 90a of the sensor will be generally linear with angular rotation. Any desired functional relationship between the angular rotation and the sensor output may be achieved by shaping the radius-angle function. Output detection is provided at 90b.

Those skilled in the arts will appreciate that the angled conducting surface may be fixed in position, and the eddy-current coil moved axially along the surface; or that the eddy-current coil may be fixed in position and the angled conducting surface moved axially relative to the coil; or that both elements may be on separate parts and the indicated motion will be the relative positioning between the two parts.

We claim:

1. A motion transducer comprising:
   a) one or more electromagnetic coils provided on a first element, each of said coils having a magnetic axis of symmetry,
   b) a conducting surface provided on a second element longitudinally moveable with respect to said first element, said surface oriented so as not to be normal to the said magnetic axis or axes of symmetry of said electromagnetic coil or coils,
   c) first means to excite said coil with an alternating voltage or current,
   d) second means to detect the impedance of said coil or coils using said first means to excite said coil, and
   e) third means to interpret detected impedance of said coil in terms of relative displacement of said conducting surface with respect to said coil,
   f) said conducting surface defines an axially spaced sequence of single planes inclined to a linear axis defined by said second element,
   g) and a selected number of said electromagnetic coils being provided and being axially spaced, in a sequence or sequences on said first element, and extending in two rows, at opposite sides of said axis, said planes having varied angularity and spaced apart axially,
   h) the coils being electrically connected to combine coil outputs thereby removing the effect of any lateral movement of said second element.

2. The apparatus of claim 1 wherein said conducting surface defines a sequence of single planes inclined at an angle to a linear axis defined by said second element.

3. Apparatus as defined in claim 1 wherein an auxiliary electromagnetic coil, not exposed to said conducting element, is used to provide a compensating signal that may be subtracted from output of all of said electromagnetic coils.

4. The method of operating a motion transducer including electromagnetic coils having impedance, and conducting surface means, that includes
   a) electrically energizing said coils in alternating sense, each coil having a magnetic axis of symmetry, said surface defining a sequence of inclined planes,
   b) relatively displacing said coil means and said conducting surface means, while maintaining said surface means out of perpendicularity relation to an axis defined by the coil means, thereby to produce changes in the coil means impedance,
   c) and detecting said changes in impedance as a function of said relative displacement,
   d) said coils located in two rows, at opposite sides of said axis, and being electrically connected.

* * * * *